May 29, 1956 W. A. SCHULTZ ET AL 2,747,799
LIQUID FUEL BURNING APPARATUS AND CONTROL
Filed Jan. 23, 1952 6 Sheets-Sheet 1

FIG. 1 Condition between fires

INVENTORS
WILBUR A. SCHULTZ
BY ARTHUR R. MOORE

West Oldham
ATTORNEYS

INVENTORS
WILBUR A. SCHULTZ
ARTHUR R. MOORE
BY
West Oldham
ATTORNEYS

May 29, 1956　　　W. A. SCHULTZ ET AL　　　2,747,799
LIQUID FUEL BURNING APPARATUS AND CONTROL
Filed Jan. 23, 1952　　　　　　　　　　　　　6 Sheets-Sheet 6

INVENTORS
WILBUR A. SCHULTZ
BY ARTHUR R. MOORE

ATTORNEYS

United States Patent Office 2,747,799
Patented May 29, 1956

2,747,799

LIQUID FUEL BURNING APPARATUS AND CONTROL

Wilbur A. Schultz, Lakewood, and Arthur R. Moore, Cleveland, Ohio, assignors, by mesne assignments, to Hupp Corporation, Detroit, Mich., a corporation of Virginia Application January 23, 1952, Serial No. 267,844

9 Claims. (Cl. 236—1)

This invention relates, generally, to liquid fuel burning apparatus, and more particularly to electrical ignition and control means or systems that render such apparatus automatic in operation.

The invention is similar to, and is an improvement upon, the electrical ignition and control system originally disclosed in an application filed June 16, 1950, by Marc Resek et al., Serial No. 168,524, now Patent No. 2,693,849, dated November 9, 1954, and that now constitutes the subject matter of an application that was filed as a division of the former case on August 14, 1951, by Marc Resek et al., Serial No. 241,866, now Patent No. 2,693,913, dated November 9, 1954. The present invention involves, besides a novel combination and arrangement of electrical devices that are constituents of the system, certain structural details of the liquid fuel burning apparatus that are peculiar to our improved system.

It is the general object of our invention to provide, in a system of the kind referred to, features that will improve the operation of the apparatus; that will render it safer and more reliable; that will prevent overflow; that will safeguard the electrical igniter from overheating and burning out by preventing energization of the igniter while the burner is hot; that will protect against the admission of fuel to the burner in the event that the igniter is not heated to fuel igniting temperature in the normal sequence of operation; that will avoid an "overlap" or time interval between the start of the fuel feed and the deenergization of the igniter, which characterized the operation of the predecessor system; and that will positively prevent the delivery of fuel to the burner while the igniter is energized.

Another object of our invention is to provide an improved electrical ignition and control system wherein the ignition phase or cycle of operation is carried out over a definite predetermined period of time under normal conditions, and which period is automatically varied under such abnormal conditions as a marked drop in the ambient temperature and appreciable variations in the voltage of the power supply.

Another object of the invention is to provide means whereby an electric circuit that is individual to the motor of the air impeller which supplies combustion and scavenging air to the burner is opened to deenergize the motor and stop the impeller during that phase of a cycle of operation in which the igniter is energized, obviously so as not to affect the temperature of the igniter, but at all other times is closed to energize the motor and operate the impeller thereby to provide air for combustion or scavenging purposes.

Our improved system involves a thermosensitive means, desirably a thermocouple, that is supported in close and rather definite relationship to the electrical igniter and its associated parts, and to the point of fuel admission, as well as to the bottom of the burner; and a further object is to provide a construction that insures the establishment and maintenance of these relationships, and that is relatively simple and affords convenient removal and emplacement of the thermosensitive means, and the igniter with its associated parts, the construction desirably involving a unitary assembly comprising a plate that carries the thermosensitive means or thermocouple and the igniter with its associated parts and that is detachably connected in a given position to the burner.

The foregoing objects and advantages, with others that will hereinafter appear, are attained in the embodiment of the invention illustrated in the accompanying drawings, wherein like reference characters designate like parts throughout the several views.

Figure 5:
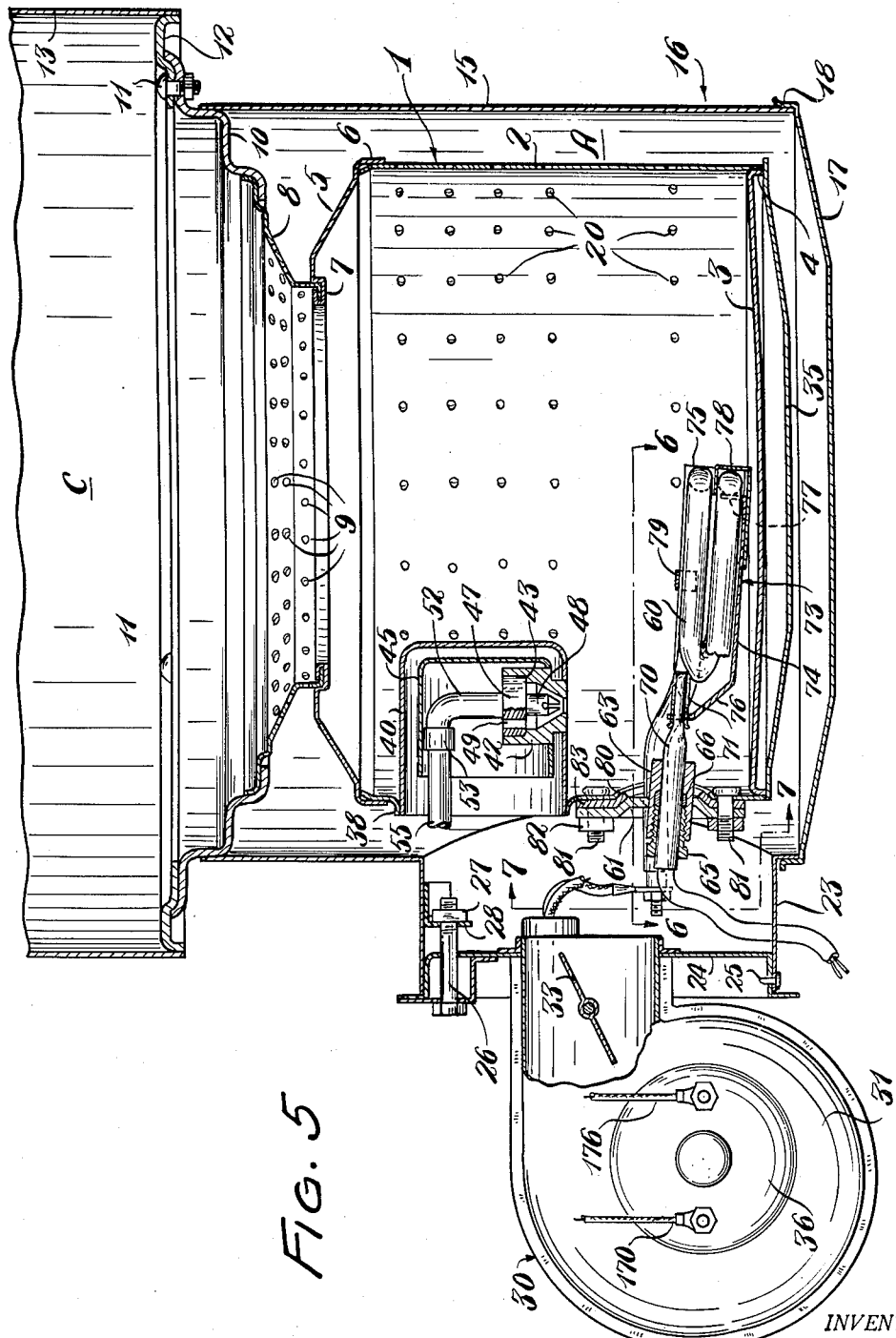
Figure 6:
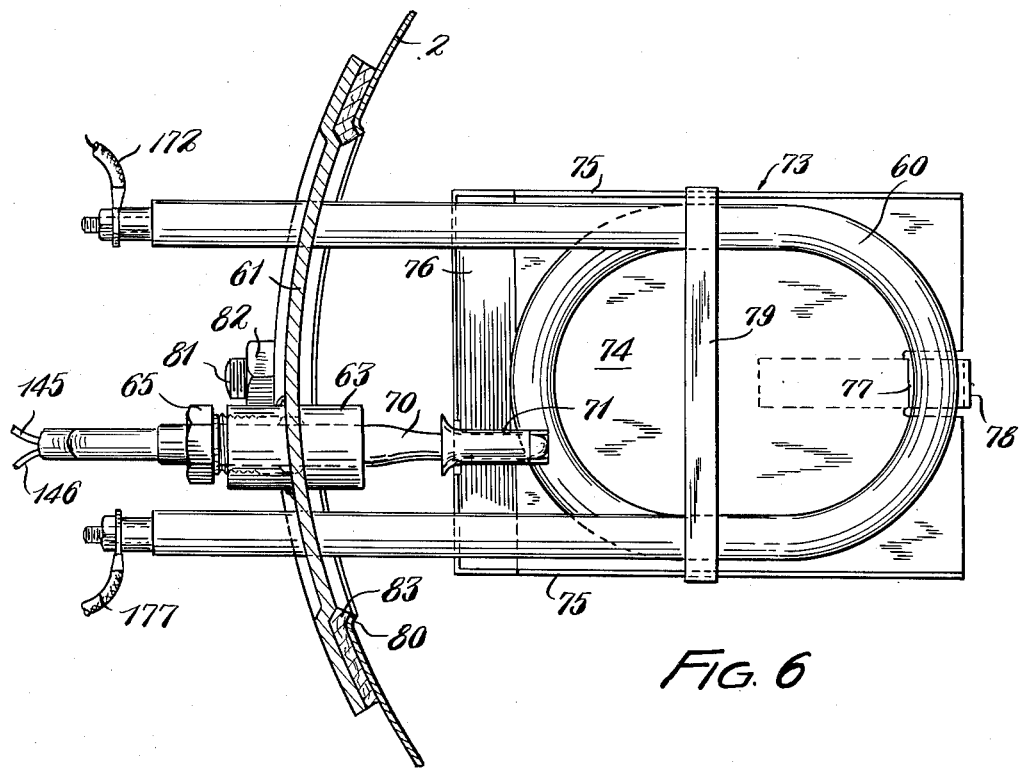
Figure 7:
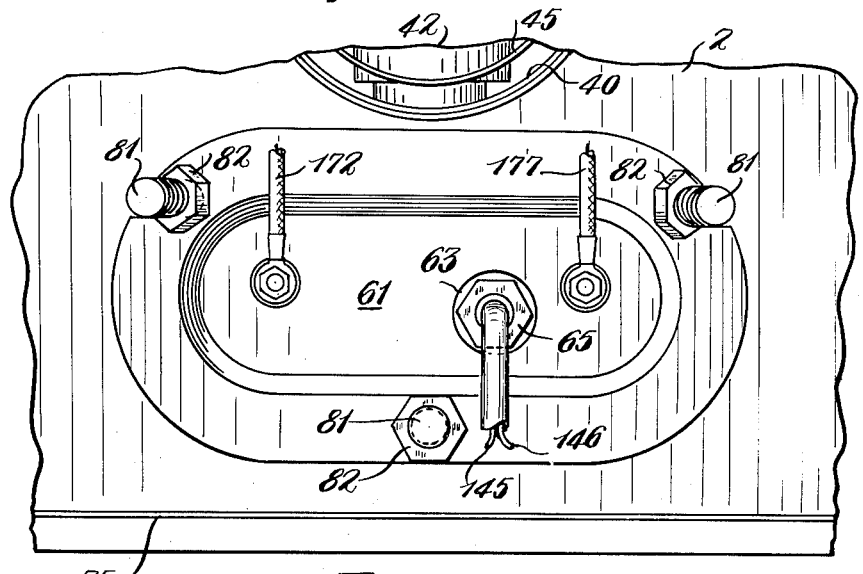

Fig. 5 is a fragmentary sectional side elevation of the liquid fuel burning apparatus incorporating the detachable unitary assembly comprising the thermosensitive means or thermocouple, and the igniter with its attachments; and Figs. 6 and 7 are sections on the lines 6—6 and 7—7, respectively, of Fig. 5.

Before proceeding with a description of our improved electrical ignition and control system, we will direct attention to the liquid fuel burning apparatus that incorporates, as constituents of the system, the igniter, thermocouple, and motor of the air impeller.

This apparatus is very similar in construction to the one disclosed in the aforesaid Patent No. 2,693,849. The apparatus includes a vaporizing burner of the pot or bowl type, and by reference to Fig. 5 it will be seen that the burner, designated generally by the reference numeral 1, includes a peripheral wall 2, and a slightly dished bottom wall 3, the latter being provided with a depending edge flange 4 that is engaged within and is welded to the bottom of the peripheral wall. An upwardly convergent top wall 5, having a depending edge flange 6, is engaged downwardly over the upper end of the peripheral wall 2 and is secured thereto, as by welding. The top wall is provided with a relatively large central opening about which said wall is connected, by means of a lock seam 7, with an upwardly flaring throat member 8 having perforations 9. The throat member is suitably joined to a stepped ring-like member 10 that is detachably connected, as by bolts 11, to the annular bottom wall 12 of a drum-like casing 13 that encloses the combustion chamber C. Secured to and depending from a cylindrical part of the stepped ring-like member 10 is the peripheral wall 15 of what may be referred to as an air housing, designated generally by the reference numeral 16, and to the lower end of which is suitably attached, as by welding, a bottom wall 17. This bottom wall is shown as dished, and as having an upstanding edge flange 18 that telescopes over the lower end of the previously mentioned wall 15. The housing 16 encloses an air chamber A from which air is admitted through perforations 20 in the wall 2, to the interior of the burner 1. The perforations 20 are arranged in horizontal rows, the lowest row being a substantial distance above the bottom wall 3.

Suitably connected, as by welding, to the front portion of the wall 15, about a relatively large circular opening therein, is a tubular extension or neck 23 into the front end of which is fitted a flanged closure 24. At its lower side an aperture in the closure is engaged over a stud 25 that is carried by the neck 23, while the upper side of the closure is connected, by a bolt 26, to a nut 27 that is carried by a bracket 28 which is attached to and depends from the neck 23 adjacent the top thereof.

An air impeller or blower, designated generally by the reference numeral 30, is illustrated as being of the conventional type includes a snail shell casing 31, the discharge extension of which projects through an opening in the closure 24, and to which closure said casing is suitably fastened. Thus installed, the impeller is adapted to supply air to a chamber A, enclosed by the housing 16. Some of the air entering said chamber will gain access to the interior of the burner through the perforations 20, as previously explained, and air from said chamber A will also be supplied to the combustion chamber C through the perforations 9 in the throat member 8. The quantity of air delivered to the chamber A may be regulated by a damper 33 that is adjustably supported within the discharge extension of the casing 31. In order to prevent undue cooling of the bottom wall 3 of the burner, such as would interfere with proper vaporization of the fuel, said bottom wall is protected from the direct fresh air supply to the chamber A by a shield 35 that is engaged with and suitably connected to the lower end of the burner 1. The air impeller or blower 30 is driven by an electric motor 36.

Although our present improvements are applicable to bowl or pot type burners wherein the fuel is fed to the bottom portion of the bowl or pot, as through a pipe that enters through the bottom wall, we prefer, and have accordingly shown, the type of fuel feed that characterizes the burner disclosed in the previously mentioned application Serial No. 168,524, and which we shall now describe. Fitted within and secured, as by welding, to a flange 38 that surrounds an opening in the front upper portion of the peripheral wall 2 of the burner, is the outer open end of a cup-like shell 40, which we shall refer to as the outer shell. 42 denotes a nozzle guide that consists of a cylindrical body that is reduced in diameter adjacent its lower end. Said lower end occupies a circular opening in the lower side of the shell 40, the parts being welded or otherwise rigidly connected together. The nozzle guide 42 has an axial passage enlarged at its upper end to provide an annular shoulder or seat 43, and a distance below said shoulder or seat, the passage is downwardly convergent. 45 denotes an inner shell that is provided with a side opening that receives the lower portion of the larger end of the nozzle guide 42. The inner shell is also welded or otherwise firmly secured to the nozzle guide in spaced, substantially concentric relation to the outer shell 40.

Removably nested within the upper end of the nozzle guide is the relatively deep disc-like part or flange 47 of a fuel nozzle 48, the tubular tip of which depends axially from said flange and terminates at its lower end in a frusto-conical portion that is disposed in spaced substantially concentric relation to the tapered wall of the passage of the nozzle guide 42. Opening into the upper end of said passage are a plurality of air holes 49 in the nozzle flange 47, the portion of the flange outwardly of said holes resting upon the shoulder or seat 43. The nozzle is connected, through an elbow 52 and a coupling 53, to a fuel supply pipe 55. This pipe leads from a so-called "constant level valve," a unit that is conventional in liquid fuel burning apparatus of the class herein disclosed, and intermediate the constant level valve and the burner is an electrically operated valve, as will hereinafter more fully appear.

60 denotes an electrical igniter of the embedded sheathed type, illustrated and described more fully in the previously mentioned application Serial No. 168,524. As will be seen by reference to Figs. 5, 6 and 7, the igniter is shown as in the form of a coil having terminal portions that extend through holes in a plate 61 to which the sheath of said igniter is welded about each hole. Similarly secured within an aperture of the plate 61 is a sleeve-like supporting member 63, the bore of which, adjacent its outer end, is threaded for the reception of a sleeve nut 65. Inwardly of said nut, the bore is shaped to receive therein a split clamping ring 66. Projected through the aligned bores of the nut 65 and the inner end portion of the supporting member 63, and through the opening in the clamping ring 66, is the cylindrical body portion of a thermocouple designated 70. The reduced thermosensitive inner end of the thermocouple is received by a metallic thimble 71 that is suitably secured, as by welding, to a sheet metal baffle 73 attached to the coil of the igniter 60 in a manner presently to be described. It is evident from what has just been said that the thermocouple may be readily extended through the supporting member 63, when the nut 65 is retracted and the ring 66 is in expanded condition; and that, by tightening the nut, the ring 66 will be contacted about the body of the thermocouple thereby to secure it in place, the opposite ends of the clamping ring being tapered and the adjacent parts of the nut and supporting member being formed complementary thereto, so as to effect the action described. The previously mentioned baffle 73 is in the form of a relatively wide channel or trough including a bottom wall 74, side walls 75, and a relatively steep inclined wall portion 76, against which latter the fuel impinges as it drops from the nozzle 48, somewhat to one side of the thimble 71. The baffle is held in position on the coil of the igniter by a lug 77 that is struck upwardly from the inner edge of the wall 74, in cooperation with an L-shaped clip 78, that embraces the portion of the coil adjacent said lug and has a part welded or otherwise secured to the wall 74, and by a metal strap 79 that extends across the coil and has its ends turned downwardly over and welded to the side walls 75 of the baffle. The plate 61, and the parts supported thereby, including the igniter and thermocouple, constitute the unitary assembly hereinbefore referred to.

The lower front portion of the peripheral wall 2 of the burner is provided with a horizontally extending oblong opening surrounded by an inwardly tapered flange 80. The plate 61, which is larger than said opening, but of the same shape, is adapted to be secured to the wall 2 about the opening by studs 81. These studs are carried by the wall and project forwardly through the plate, and nuts 82 are applied to the studs, a gasket 83 being shown as compressed between the marginal portion of the plate and the underlying portion of the wall. With said unitary assembly thus attached to the burner, the inner end portion of the baffle 73 and adjacent end of the igniter 60 are disposed in close proximity to the bottom wall 3 of the burner, a feature of importance, as will hereinafter appear.

Figure 1:
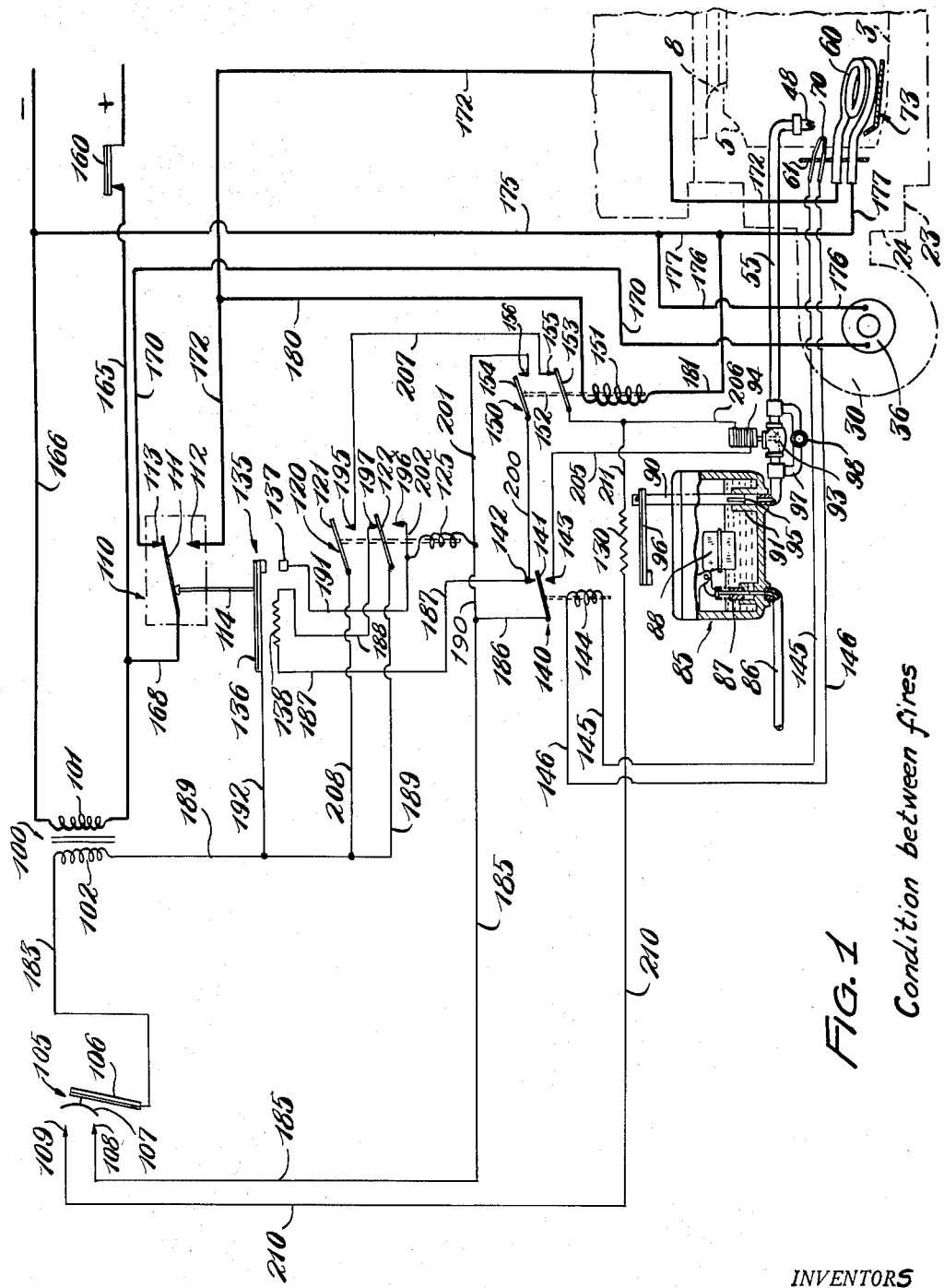
Fig. 1 is a diagram of our improved electrical ignition and control system and parts of the liquid fuel burning apparatus in connection with which it is used, the present view representing the system in "shut down" or inactive condition, as it would be between operating cycles, when the switch of the space or room thermostat is open.

Liquid fuel is supplied to the burner through the previously mentioned constant level valve, shown conventionally in Fig. 1, where it is designated generally by the reference numeral 85. It consists of a receptacle to which fuel is conveyed from a suitable source (not shown) by a pipe 86, under the control of a valve 87 that is closed by a float 88 wherewith the valve has the usual operative connections, when fuel rises within the receptacle a given distance.

Also incorporated in the unit now under consideration is a metering valve 90 that reciprocates within a hollow boss 91. This boss rises from the bottom of the receptacle and terminates at its upper end a short distance below a maximum liquid level which tends to be maintained in the receptacle by the previously described float control valve 87. Connected to the receptacle of the constant level valve in communication with said hollow boss 91 is the previously mentioned fuel supply pipe 55 that leads to the burner. Included in this pipe is a valve 93 that is biased toward closed position and is adapted to be fully opened by electrical means, shown as a solenoid 94, as will hereinafter be described. As revealed in the drawing, the metering valve 90 consists of a rod of a diameter to slidably fit within the hollow boss 91, and the rod has a slot 95 in its lower end. The valve is shown as having operative connection at its upper end with a thermostat in the form of a bimetal strip 96, and by means of this thermostat the valve is normally held at an elevation in which the slot 95 extends a short distance above the top of the boss 91. Accordingly, a limited amount of fuel will be permitted to flow by gravity to the burner when the valve 93 is opened, the quantity being such as will sustain operation of the burner at a moderate or low fire stage. In order to increase the fuel supply for "high fire" operation, the metering valve 90 is lifted to uncover more of the slot 95, and this is accomplished by applying heat, as hereinafter set forth, to the thermostat constituted of the bimetal strip 96 so as to cause the strip to warp in a direction to elevate the valve.

It is apparent from the foregoing that a substantially constant head of liquid is maintained in the constant level valve 85 which serves to impel the fuel toward the burner with practically uniform pressure when the valve 93 is opened, thereby allowing the customary reservoir or tank that constitutes the source of fuel supply (not shown) to be at any convenient elevation above that of the constant level valve.

As an emergency measure, so that the burner may be made to operate on low fire in case of a power failure, a by-pass 97 is provided in the pipe 55 about the valve 93, the same being equipped with a manual valve 98.

The electrical system of the present invention, by means of which the operation of the above described liquid fuel burning apparatus is automatically controlled, includes, besides the previously mentioned motor 36 of the air impeller 30, the igniter 60, and the thermosensitive means or thermocouple 70, the following parts: a transformer 100, the primary and secondary windings of which are designated 101 and 102, respectively; a space or room thermostat 105 that is subjected to the temperature that is to be controlled and is shown conventionally as comprising a thermosensitive element 106 of the bimetal variety through which, and a leaf 107 that is carried thereby, current is adapted to be conducted to a "low fire" contact 108 (when the strip 106 is deflected to a limited extent) and to a "high fire" contact 109 (when said strip is further deflected); and a so-called microswitch 110, the movable element 111 of which is biased in a direction to engage a contact 112, and which is movable into engagement with a contact 113 through the intervention of a push rod 114 by means presently to be introduced.

Continuing with a description of the parts of the system, 120 denotes, generally, a relay switch including blades 121 and 122 that are operatively connected to the core of a solenoid 125, it being understood that the terms herein employed are illustrative rather than limiting, and that they embrace any reasonable equivalent of the part schematically illustrated. Associated with the previously mentioned bimetal strip 96 that constitutes the thermostat of the metering valve 90, is an electric resistance heater 130, and when this heater is energized and its temperature accordingly raised it causes the bimetal strip to warp in a direction to lift the metering valve to wide open position, as previously set forth, thereby to pass sufficient fuel to maintain high fire operation of the burner, as will again be mentioned in its proper sequence in the description of the operation of the system.

Associated with the aforesaid microswitch 110, and having operative connection with the movable element 111 thereof through the push rod 114, is what may be termed a "thermal timer," designated generally by the reference numeral 135. This thermal timer is responsible for certain important advantages peculiar to the present system, and it is shown as consisting of a bimetal strip 136 which, when heated, warps gradually in a direction to ultimately engage a contact 137, but which, prior to such engagement, as when deflected a fraction of its full range of movement toward the contact 137, permits retraction of the rod 114 and allows the element 111 of the microswitch 110 to snap into engagement with the contact 112. Heat is adapted to be imparted to the strip 136 by an electrical resistance heater 138, when the latter is energized.

140 denotes what may be termed a "thermal operated switch" for the reason that it is actuated indirectly by heat existing within the burner, either as the result of combustion or the energization of the igniter 60. The movable element 141 of this switch is biased in a direction to cause it to normally engage a contact 142, and it is adapted to be moved into engagement with a contact 143 when the operating means 144 of said switch is actuated in response to the heat existing in the burner. Said operating means is herein disclosed, in a schematic way, as an electromagnetic means or solenoid which has operative connection with the movable element of the switch and is in circuit, through conductors 145 and 146, with the thermocouple 70. This thermal operated switch 140, considering its particular manner of association with and its relation to other parts of the system, constitutes a further novel feature of the present invention that distinguishes it from its predecesor and is responsible for certain important advantages and safeguards, as will more fully appear hereinafter.

We have referred to the thermal timer 135 that is associated with and operatively connected to the microswitch 110 and involves the electrical resistance heater 138. Another novel feature of our present system resides in what may be termed the "thermal timer auxiliary," designated generally by the reference numeral 150, and shown as consisting of a solenoid 151, the core 152 of which is connected to the movable conducting elements or blades 153 and 154. The former blade is biased toward and normally engages a contact 155, and when the solenoid 151 is energized the element or blade 153 will be withdrawn from said contact, thereby to open the circuit which said element or blade controls, and the element or blade 154 will be moved from an open circuit position to a closed circuit position in engagement with a contact 156.

160 designates a so-called "top limit switch," a safety feature usually employed in domestic furnaces and other similar apparatus to open a circuit and shut down the system in case the apparatus becomes overheated, the switch being disposed in intimate heat exchange relation to a suitable part of the apparatus.

Fig. 1, as hereinbefore stated, and as designated on the drawing, represents the condition of the system between fires or, in other words, between cycles. The system, according to this view, is inactive excepting the motor 36 of the air impeller 30.

Most of the conductors that make up the various circuits involved in the system will be designated by reference numerals and thus introduced during the description of the operation, but prior thereto it may be well to explain that a branch of the usual house circuit, having a potential of say 110 volts, is constituted of a conductor 165 that leads to the primary winding 101 of the transformer 100, and a conductor 166 that leads from said winding, the respective conductors 165 and 166 representing the positive or "hot" side, and the negative or "ground" side of the circuit. The circuits of high potential or voltage are represented in the drawings by heavy lines, and those of comparatively low potential, say 24 volts, by light lines. The motor 36 of the air impeller, the igniter 60, the microswitch 110, and the solenoid 151 of the thermal timer auxiliary, are in the high voltage circuits, as clearly shown in the drawings and as hereinafter described.

Operation

With the system in the condition illustrated in Fig. 1— that is, between cycles or "fires"—current is carried from the conductor 165, through a conductor 168, to the movable element 111 of the microswitch 110, presently engaging the contact 113 thereof. This contact 113 is placed in electrical connection with one side of the motor 36 through a conductor 170. The other contact 112 of the said microswitch has electrical connection, through a conductor 172, with one terminal of the igniter 60. Current returns from the motor and igniter to the other side of the high voltage circuit through a conductor 175 and its respective branches 176 and 177. Electrical energy of the higher potential is also carried from conductor 172 through a conductor 180 to the previously mentioned solenoid 151 and returns, through a conductor 181 and the previously mentioned conductors 177 and 175, to the ground side of the supply circuit that is represented by the conductor 166. The beforementioned top limit switch 160 is shown as in the positive or "hot" side of the supply circuit represented by the conductor 165, ahead of the microswitch 110. The circuits of lower voltage have as their source of current the secondary winding 102 of the transformer 100.

As brought out above, the apparatus and its control system, as illustrated in Fig. 1, are inactive excepting for the operation of the air impeller, it being assumed that the temperature of the space to which the thermostat 105 is subjected is above the temperature range for which the thermostat is set, and which may be referred to as the "comfort range," it being understood that prevailing conditions do not require low fire operation. Also, as explained above, and as inscribed upon the drawings, Fig. 2 represents the condition of the system during the ignition phase of a cycle of operation, Fig. 3 during the low fire phase, and Fig. 4 during high fire operation, the latter phase not necessarily being a part of every cycle. High fire operation occurs only when low fire operation is insufficient to maintain the temperature within the comfort range. In the respective views (excepting Fig. 1), the closed circuits, or those to which current is being supplied during the phase illustrated, are shown in full lines. The open circuits are indicated in dotted lines.

Ignation phase

The ignition phase will first be described by reference to Fig. 2.

Upon a decline of temperature to the upper limit of the comfort range, the element 106 of the space or room thermostat 105 will swing in a direction, and only far enough, to engage the leaf 107 with the contact 108. This will cause a circuit to be established from the secondary winding 102 of the transformer 100, through a conductor 183, the aforesaid parts of thermostat 105, and conductors 185 and 186 to the movable conducting element or blade 141 of the thermal operated switch 140, which is presently engaged with the contact 142. The current will continue through a conductor 187, the resistance heater 138 of the thermal timer 135, a conductor 188, the blade 122 of the relay switch 120, and a conductor 189, to the source.

With the resistance heater 138 energized, heat is imparted to the thermostatic element or bimetal strip 136 of the thermal timer 135, causing said strip to gradually warp downwardly. When said strip warps to the extent illustrated in Fig. 2, it allows the movable conducting element or blade 111 of the microswitch 110 to withdraw from the contact 113 and engage contact 112. This action of the microswitch opens the circuit through the conductor 170 to the motor 36 of the air impeller, and establishes a circuit through the previously mentioned conductor 172, igniter 60, and conductors 177 and 175 to the ground side of the supply circuit represented by the conductor 166. With the igniter thus energized, the ignition phase is instituted. Simultaneously with the foregoing, a circuit is established through the conductor 180, solenoid 151, and the conductor 181 which joins the previously mentioned conductor 177. With the solenoid 151 energized, the conducting element or blade 153 is withdrawn from contact 155 and the element or blade 154 is engaged with the contact 156.

Figure 2:
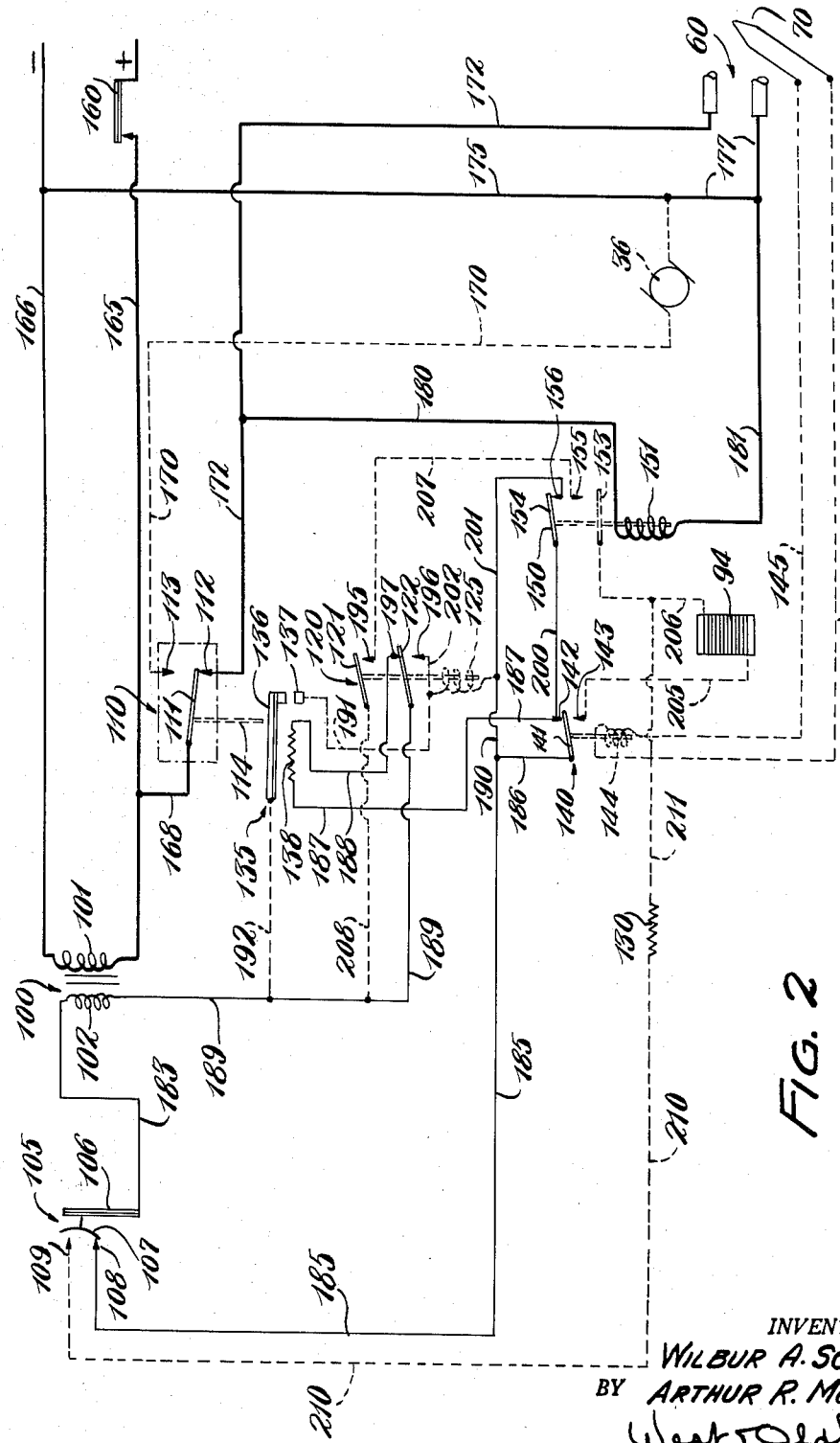
Fig. 2 is a diagram illustrating the condition of the system immediately after the space or room thermostat responds to a call for heat and closes the "low fire" side of the switch, the present view representing the ignition phase of a cycle of operation, as noted on the drawing.

It will be apparent from the foregoing description, and by reference to Fig. 2, that during the initial part of the ignition phase and after the thermal timer auxiliary solenoid 151 is energized, an alternate circuit to the bimetal heater element 138 is established. This alternate circuit connects the bimetal heater element 138 with a source of electrical energy through the following path: from conductor 185, through conductors 190 and 201, contact 156 and blade 154 of the thermal timer auxiliary 150, conductors 200 and 187, the bimetal heater 138, conductor 188, contact 197, and blade 122 of relay switch 120, and conductor 189 to the source. This alternate current path to the bimetal heater 138 is provided in order to insure that, once said heater 138 is initially energized, it will be maintained in that condition for the period of time required by the bimetal leaf 136 in moving from its original position to a position in engagement with contact 137.

As the bimetal strip 136 of the thermal timer 135 continues to warp under the influence of the heat given off by the resistance heater 138, it will finally engage contact 137. Thereupon, a circuit is established from the contact 108 of the room thermostat through conductor 185 and a conductor 190, solenoid 125 of the relay switch 120, a conductor 191, contact 137, strip 136, and conductors 192 and 189 to the source. The circuit including the solenoid 125 and conductors 191 and 192 is shown in dotted lines in Fig. 2 because, according to said view, the closing of this circuit is subsequent to the condition illustrated in said view, namely, that in which the bimetal strip 136 has not yet engaged the contact 137. Upon energization of the solenoid 125, the conducting element or blade 121 is caused to engage contact 195, and the blade 122 is caused to withdraw from contact 197 and engage a contact 196. When the blade 122 moves away from contact 197 it opens the previously described circuit including the resistance heater 138 thereby causing the temperature of said heater to decline. As a consequence, the bimetal strip 136 will start to cool (withdrawing from contact 137) and will gradually return toward its original position, passing through the position shown in Fig. 2. Notwithstanding the fact that the previously described circuit through the solenoid 125, by way of contact 137 and strip 136, is opened by the withdrawal of said strip from the contact, a so-called "holding" circuit for the solenoid 125 is now established through conductors 185 and 190, the solenoid 125, a conductor 202, contact 196, blade 122 and conductor 189 to the source. This maintains the solenoid 125 energized and the conducting elements or blades 121 and 122 in engagement with the respective contacts 195 and 196.

During the time consumed by the foregoing operation, the temperature of the igniter 60 has risen to fuel igniting intensity, and it has heated the thermocouple 70 sufficiently to generate current through the circuit represented by conductors 145 and 146 and including the operating means or solenoid 144 of the thermal operated switch 140, and cause the movable element 141 of said switch to withdraw from contact 142 and engage contact 143.

It may be explained that the thermocouple 70 is so positioned with respect to the igniter 21 and that it and the actuator 144 are so constructed, that the time interval (measured from the time the igniter 60 is first energized) required for the thermocouple to heat sufficiently to effect actuation of the switch 140 is approximately one and one-half to two minutes, and substantially the same period of time is required for the bimetal strip 136 of the thermal timer 135 to travel from its original "cold" position toward and into engagement with the contact 137 and then withdraw therefrom.

The bimetal strip 136, upon cooling for a further minute or so, resumes its original or "cold" position, shown in Fig. 1, whereupon, through the intervention of the push rod 114, it moves the element or blade 111 of the micro switch out of engagement with the contact 112 and returns it into engagement with the contact 113. This, as will be evident from the foregoing, results in the deenergization of the igniter 60 and in the opening of the circuit to the solenoid 151 of the thermal timer auxiliary 150. As a consequence, the conducting elements or blades 153 and 154 are returned to their original positions—that is to say, out of engagement with the contact 155, and into engagement with the contact 156, respectively. Thus the cycle of operation is advanced to the low fire phase.

*Low fire phase*

Figure 3:
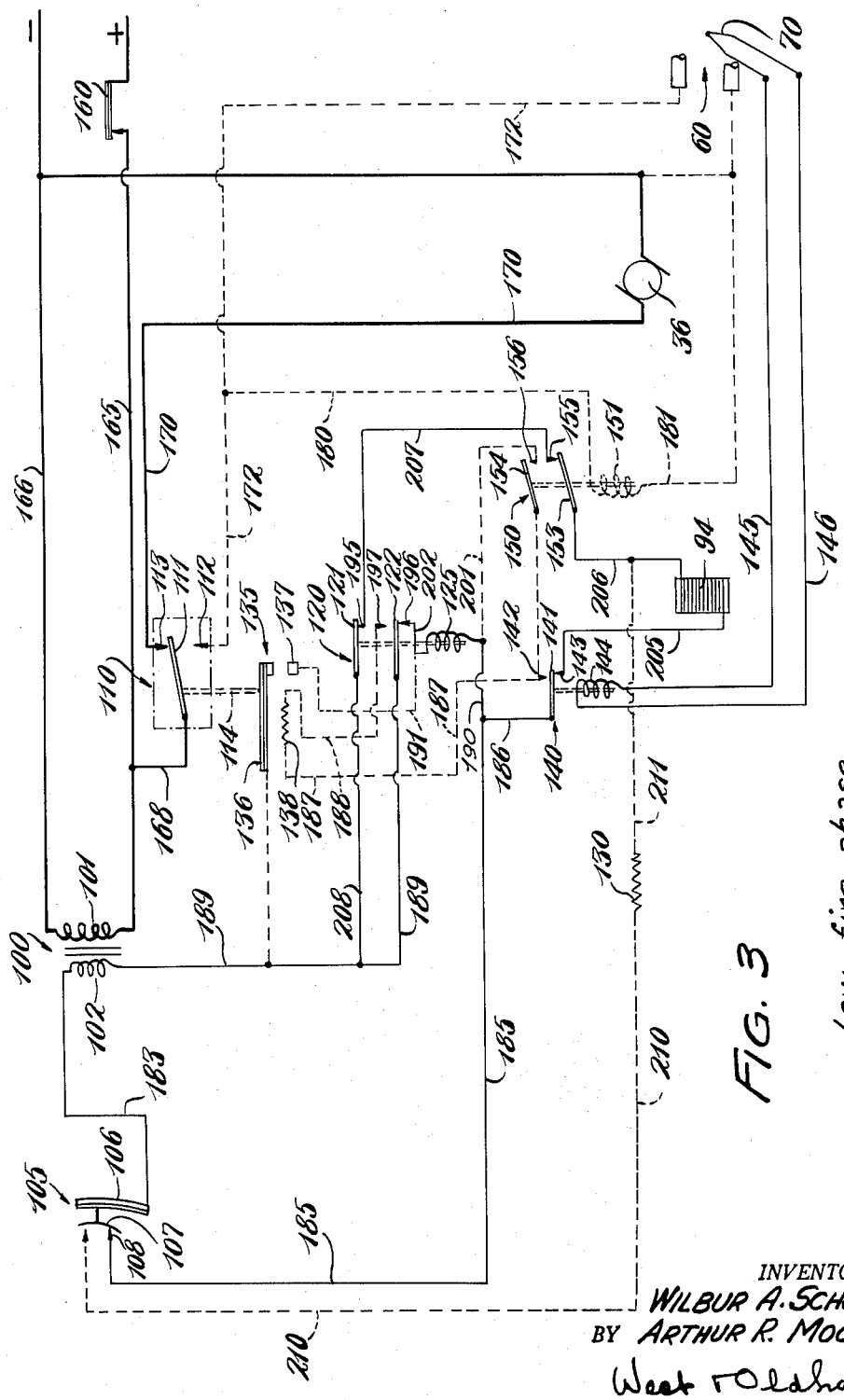
Fig. 3 is a similar view showing the system during the low fire phase of a cycle of operation.

We shall now describe the low fire phase of operation by reference to Fig. 3.

The above described action of the thermal operated switch 140, due to the heating of the thermocouple 70, and the resultant movement of the conducting element or blade 141 into engagement with the contact 143, establishes a circuit that includes the solenoid 94 of the fuel valve 93 and which circuit will now be described. Current from the secondary winding 102 of the transformer 100 flows through the conductor 183, element 106 and leaf 107 of the space or room thermostat 105, contact 108, conductors 185 and 186 to the movable element 141 of the thermal operated switch 140. With the blade now in engagement with the contact 143, the current continues on through a conductor 205 to the aforesaid solenoid 94, and thence through a conductor 206, conducting element or blade 153, contact 155, a conductor 207, blade 121 of the relay switch 120, and a conductor 208, and the previously mentioned conductor 189, to the source.

It is evident from what has been described that the deenergization of the igniter and the admission of fuel to the burner, due to the opening of the valve 93 by the energization of the solenoid 94, occur simultaneously; it being noted that the completion of the circuit just described is effected upon the ultimate closing of blade 153 against contact 155—a condition brought about by the deenergization of the thermal timer auxiliary coil 151 by virtue of the switching action of the microswitch 110. As the fuel descends to one side of the thermocouple 70 so as to avoid chilling the latter, it impinges upon the hot baffle 73 and is vaporized, and is lighted by the heat retained by the igniter 60 immediately following the deenergization of the igniter. By the nature of the control system, as herein disclosed, energization of the igniter, at the time fuel is being admitted to the burner, is positively prevented. This avoids the possibility of the igniter becoming overheated by its being energized while combustion is present in the burner. Experimentation and practice have shown that igniter deterioration or destruction is due principally to the fact that the igniter is permitted to operate at too high a temperature, such as occurs when the igniter is energized while combustion prevails within the burner. Under such a combination of circumstances the sheath of an igniter of the type herein disclosed and which is preferred by us, may reach a temperature in excess of 1900° F., in contrast to a safe operating temperature of from 1400° to 1500° F.

As long as outdoor temperatures remain moderate enough to permit low fire operation to maintain an indoor temperature within the comfort range, the system will continue to function in the manner just described. Such operation will proceed until the upper limit of the comfort range has been reached, whereupon the switch of the space or room thermostat 105 will open and the system will accordingly become inactive, as represented in Fig. 1.

*High fire phase*

Figure 4:
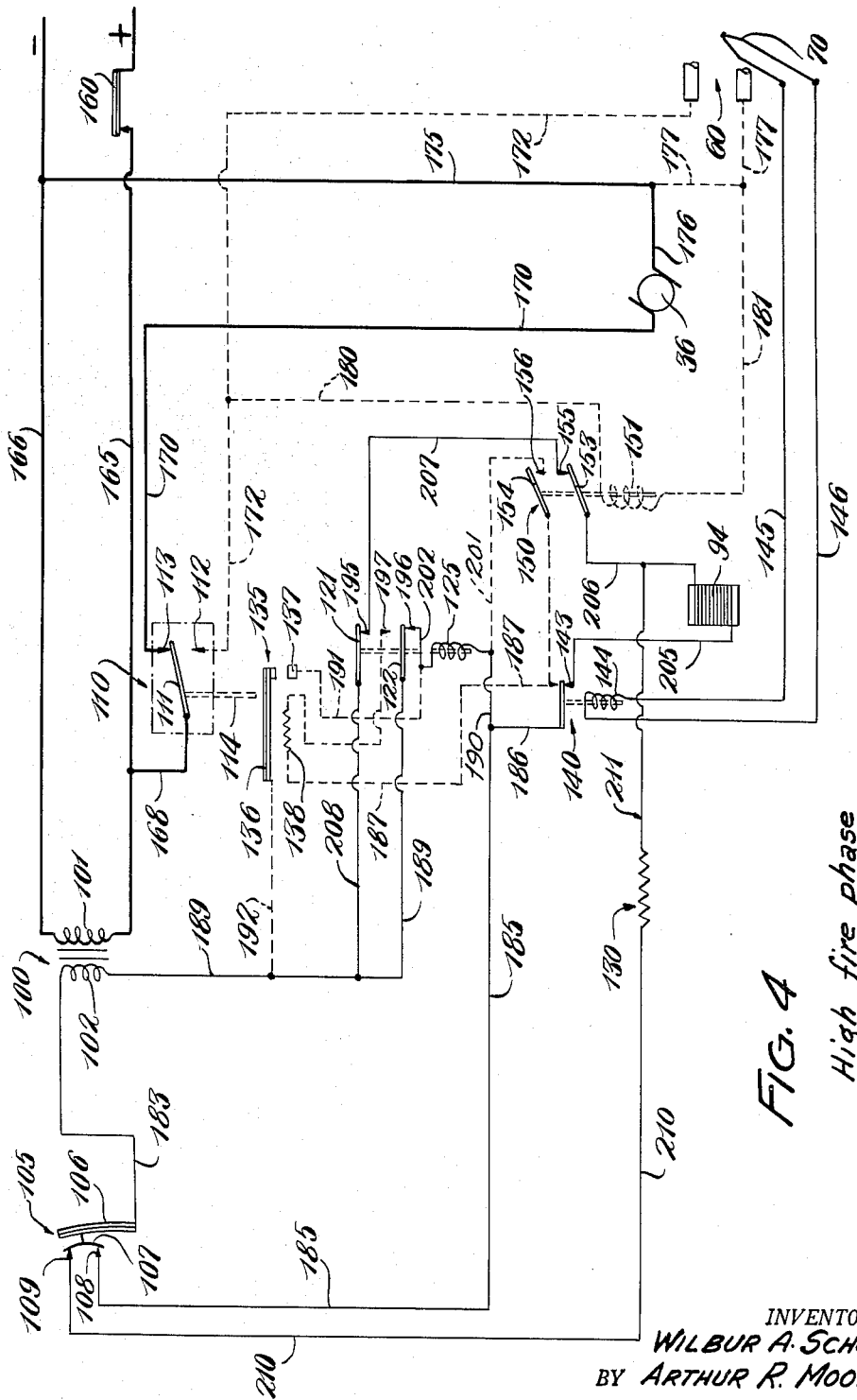
Fig. 4 is a diagrammatic representation of the system in high fire condition, which occurs when the space or room thermostat responds to the call for additional heat and closes the "high fire" contact while maintaining the "low fire" contact closed.

In the event, however, that the outdoor temperature drops so low that the heat supplied by the combustion apparatus under low fire operation is insufficient to restore and maintain an indoor temperature within the comfort range, the element 106 of the space or room thermostat 105 will swing further under the influence of a declining temperature until the leaf 107 engages both contacts 108 and 109, as illustrated in Fig. 4, thus initiating the high fire phase of a cycle of operation. This action of the thermostat 105 closes an additional circuit from the secondary winding 102 of the transformer 100 through the conductor 183, the beforementioned elements of said thermostat, contact 109, a conductor 210, the resistance heater 130 that is associated with the bimetal strip 96 of the metering valve 90 that constitutes a part of the liquid level control valve 85, a conductor 211, the previously mentioned conductor 206, blade 153, contact 155, conductor 207, conducting element or blade 121, and conductors 208 and 189, to the source. Energization of the resistance heater 130 will cause the bimetal strip 96 to warp in a direction to further elevate the metering valve 90, thus feeding more fuel to the burner to sustain high fire operation.

From the foregoing disclosure it will be evident that our improved electrical ignition and control system affords many protective features, conspicuous among which are the following:

In case the igniter 60 fails to function, the thermocouple 70 will not be heated and the switch 140 will not act to close the circuit to the solenoid 94 of the fuel valve 93. Accordingly, no fuel will be fed to the burner. Due to the action of the relay switch 120, this situation results in what is known as a "locked out" condition—that is to say, a condition wherein the system will not recycle unless the switch including the "low fire" contact 108 of the room thermostat 105 is opened and reclosed.

In the event the igniter operates properly, and upon deenergization thereof oil is immediately fed to the burner according to normal operation but does not ignite, the thermocouple will cool and the switch 140 will shift to the position to open the circuit to the solenoid 94, causing the fuel valve 93 to close and shut off the supply of fuel to the burner. This also results in a locked out condition.

If fuel is being fed to the burner faster than it can be consumed (due to faulty metering, insufficient combustion air, or other abnormal condition), the fuel level in the burner will rise. When the fuel reaches even the lower portion of the igniter-thermocouple assembly, it will dissipate the heat of the assembly and have a chilling effect upon the thermocouple, whereupon the switch 140 will shift to the position to open the circuit to the solenoid 94 and cause the fuel valve 93 to close and shut off the flow of fuel to the burner. This, however, does not lock out the system. As soon as the excess fuel is burned and the fuel level recedes below the bottom of the aforesaid assembly, the thermocouple will again be heated by combustion and generate current to actuate the switch 140, causing it to close the circuit to the solenoid 94, thereby to open valve 93 and restore the flow of fuel to the burner.

In the event the storage tank or reservoir (not shown) which provides the source of fuel supply, runs out of fuel while the burner is in operation and the fire goes out, the thermocouple will cool and again produce a locked out condition. When the tank or reservoir is replenished, the system may be recycled to start the apparatus in operation by opening and closing the operating circuit, as by means of the switch constituted of the thermostat 105.

In the case of an electric power failure, the burner shuts off, and will restart automatically when power is restored.

As pointed out during the description of the operation, protection of the igniter is assured by the fact that it is impossible to energize the igniter concurrently with the energization of the solenoid 94 that opens the fuel valve; and in case of fuel "pooling" in the burner, so to speak, prolonging a combustion period, an ignition cycle cannot be started while this combustion continues due to the heated condition of the thermocouple and the resultant condition of the thermal actuated switch 140.

Having thus described our invention, what we claim is:

1. In combination, a liquid fuel burner, electrical means for effecting delivery of fuel to the burner, an electrical igniter for the burner, a thermostatic circuit-closer subjected to the temperature to be controlled, a thermosensitive device in heat exchange relation to the igniter and to the zone of combustion of the burner, a first switch having a first set of contacts and a second set of contacts, the former set being biased toward closed position and the second set being biased toward open position, an electrical actuator for said switch which, when energized, opens the first set of contacts and closes the second set, an electric circuit energized in response to said thermosensitive device, when heated, including said electrical actuator, a thermal timer comprising a thermostat and a circuit-closer rendered effective thereby when the thermostat is heated and an electrical heater for heating the thermostat, an electromagnetically operated relay characterized by a switch including a first set of contacts that are biased toward contacting position and a second set and a third set of contacts, each second and third set being closed when the relay is energized, a first source of voltage, a second circuit including said first source of voltage, the thermostatic circuit-closer, the electrical heater of the thermal timer, the first set of contacts of said first switch, and the first set of contacts of the switch of said relay, a third circuit including said first source, the circuit-closer of the thermal timer and said relay, a fourth circuit including, with the aforesaid first source of voltage, said relay and its second set of contacts thereby to function as a holding circuit for the relay switch, a thermal timer auxiliary comprising an electromagnetic means and a switch operated thereby including a first set of contacts biased to open position and that are engaged when said electromagnetic means is energized, a fifth circuit including said first source of voltage, the second set of contacts of the first switch, the electrical means effecting delivery of fuel, the second set of contacts of the thermal timer auxiliary, and the third set of said relay switch, a sixth circuit including, with said first source of voltage, the first set of contacts of the thermal timer auxiliary and the electrical heater of the thermal timer, a further switch including a set of contacts biased to open position, operative connections between said further switch and the thermostat of the thermal timer whereby the set of contacts of said further switch are closed when said thermostat is heated, a second source of voltage, and a circuit system including the second source of voltage, said set of contacts of said further switch, the electrical igniter, and the electromagnetic means of the thermal timer auxiliary.

2. The combination and arrangement of parts defined by claim 1, wherein said circuit system involves two parallel branch circuits, one including the electrical igniter, and the other the electromagnetic means of the thermal timer auxiliary.

3. The combination and arrangement of parts defined by claim 1, wherein said thermosensitive device consists of a thermocouple, and the actuator of the first switch consists of electromagnetic means.

4. The combination and arrangement of parts defined by claim 1, wherein said first source of voltage is of low potential relative to said second source of voltage, whereby current of relatively high potential is supplied to the igniter and to the electromagnetic means of the thermal timer auxiliary.

5. The combination and arrangement of parts defined by claim 1, wherein said further switch is provided with a second set of contacts that are biased toward closed position and that are opened when the thermostat of the thermal timer is heated, and an air impeller for supplying combustion air to the burner, an electric motor for driving the same, and a circuit including said second source of voltage, the electric motor and the second set of contacts of said further switch.

6. The combination and arrangement of parts defined by claim 5, wherein the first source of voltage is of low potential relative to the second source of voltage, whereby current of relatively high potential is supplied to the igniter, and to the electromagnetic means of the thermal timer auxiliary, and to the motor of the air impeller.

7. The combination and arrangement of parts defined by claim 1, wherein said first source of voltage is of low potential relative to said second source of voltage, and a step-down transformer having a primary connected to the second source of voltage, and a secondary forming said first source of voltage.

8. The combination and arrangement of parts defined by claim 1 and, in addition thereto, a further circuit closed by the thermostatic circuit-closer under the influence of a temperature lower than that required to close said second circuit, an electrical heater included in said further circuit, the said further circuit including also the second set of contacts of the switch of said thermal timer auxiliary and the third set of contacts of the switch of said relay, a thermosensitive element in heat exchange relation to the last mentioned electrical heater, a metering valve for controlling the supply of fuel to the burner, and operative connections between said metering valve and the last mentioned thermosensitive element whereby said valve is operated to increase the fuel supply to the burner when said thermosensitive element is heated.

9. The combination and arrangement of parts defined by claim 1, wherein the burner is of the bowl type, and the igniter and said thermosensitive device extend into the bowl with said device so located as to be subjected to the cooling influence of an excessive amount of fuel in the bowl.

References Cited in the file of this patent

UNITED STATES PATENTS

| Re. 22,276 | Schreuder | Feb. 23, 1943 |
|---|---|---|
| 1,853,444 | McCabe | Apr. 12, 1932 |
| 1,985,991 | Harrington | Jan. 1, 1935 |
| 2,021,647 | De Lancey | Nov. 19, 1935 |
| 2,113,858 | Ray | Apr. 12, 1938 |
| 2,143,277 | McCorkle | Jan. 10, 1939 |
| 2,180,675 | Gille | Nov. 21, 1939 |
| 2,266,563 | McCorkle | Dec. 16, 1941 |
| 2,300,968 | Reichhelm | Nov. 3, 1942 |
| 2,375,900 | De Lancey | May 15, 1945 |
| 2,401,393 | Wakefield | June 4, 1946 |
| 2,482,551 | Korsgren | Sept. 20, 1949 |
| 2,500,663 | Cleveland | Mar. 14, 1950 |
| 2,630,167 | Diehl | Mar. 3, 1953 |
| 2,640,648 | Judson | June 2, 1953 |